United States Patent [19]
Davis

[11] Patent Number: 5,889,855
[45] Date of Patent: Mar. 30, 1999

[54] TELEPHONE LINE ACCESS BOX ENCLOSURE

[76] Inventor: Andrew Boyd Davis, P.O. Box 28665, San Diego, Calif. 92129

[21] Appl. No.: 842,407

[22] Filed: Apr. 25, 1997

Related U.S. Application Data

[63] Continuation of Ser. No. 467,745, Jun. 6, 1995, abandoned.
[51] Int. Cl.[6] .................................................. H04M 9/00
[52] U.S. Cl. .............................. 379/399; 379/33; 379/44; 379/437; 200/43.22
[58] Field of Search ................................. 379/399, 37, 44, 379/33; 340/652, 541; 439/331, 352, 353; 200/44, 43.22

[56] References Cited

U.S. PATENT DOCUMENTS

| | | | |
|---|---|---|---|
| 3,823,277 | 7/1974 | Rudolph | 379/445 |
| 4,584,856 | 4/1986 | Petersdorff et al. | 379/445 |
| 4,607,900 | 8/1986 | Andrews et al. | 379/445 |
| 5,369,548 | 11/1994 | Combs | 361/643 |
| 5,519,756 | 5/1996 | Clift | 379/44 |
| 5,764,729 | 6/1998 | Black et al. | 379/44 |

Primary Examiner—Jack Chiang
Assistant Examiner—Jacques M. Saint-Surin

[57] ABSTRACT

The device provides a protective enclosure OR barrier by inserting an internal housing frame into the already existing housing box provided for telephone line access. This frame accommodates a removable coverplate with custom cut holes designed for both lock (cam lock) and plunger switch (i.e. tamper switch). The original exterior cover plate is placed over the front of the inserted invention so as to hold the plunger switch down in position, ready for alarm activation. The installation of the above device prevents or deters a would-be burglar from cutting or damaging telephone lines after removal of the exterior cover plate.

3 Claims, 1 Drawing Sheet

TELEPHONE LINE ACCESS BOX ENCLOSURE

This application is a continuation of application Ser. No. 08/467,745, filed Jun. 6, 1995 now abandoned.

DESCRIPTION

1. Technical Field

This invention relates to the vulnerability of residential and commercial electronic alarm systems wherein the telephone lines may be cut or severed at the outside phone access box, causing an immediate disruption of an alarm control panel or an electronic dialer attempting to successfully send signals to the designated offsite monitoring facility.

2. Background

It is commonplace to rely on the metal coverplate installed on the outside of the external phone wire access box for providing protection of residential and commercial telephone lines used for alarm communication purposes. These metal boxes, usually having two metal screws, also help protect the general phone lines from being cut at the external telephone access box.

Current protection devices include plunger style switches or magnetic reed switches (contacts) which activate an alarm when the external telephone access box coverplate is removed or opened. Although these types of devices cause the alarm system to sound and communicate to a remote location, they cannot prevent the actual telephone line from being cut or severed which disallows full and complete communication to an off premise location. Most alarm control panels or main microprocessors (ie. communicators or dialers) which use the telephone line for main purposes of communication to an off premise location need approximately 40–90 seconds to completely transmit enough information required for proper response (in some cases it may take longer than the indicated time). If telephone lines are disrupted or severed during the indicated time frame for transmission, it is a high probability that the off premise location or device may not receive the necessary information required for a proper response (ie. police dispatch, fire department, pager or off premise devices).

Other means of telephone line back up exist by means of wireless transmissions (ie. cellular or long range FM or hard line telephone lines commonly known as multi-plex or star polling). These options are normally utilized after a normal telephone line has been cut. Therefore, it has been desirable to find some means of providing a more adequate protective device for the outside telephone access box, which would prevent initial disruption of telephone line communication to the off premise location or devices described above.

BRIEF SUMMARY OF THE INVENTION

The present invention provides a solution to the above-described problem of residential and commercial electronic alarm systems and the ease in which telephone lines may be cut or severed at the outside access box. The present device provides a protective enclosure (i.e. barrier) by inserting an internal housing frame into the already existing housing box provided for telephone line access. This particular frame accommodates a removable coverplate with custom cut holes designed for both lock (cam lock) and plunger switch (i.e. tamper switch). The original exterior cover plate is placed over the front of the inserted invention so as to hold the plunger switch down in position, ready for alarm activation. The installation of the above device prevents or deters a would-be burglar from cutting or damaging telephone lines after removal of the exterior cover plate. The cam lock is necessary for controlled access to the telephone lines and the plunger switch interfaces with alarm systems to cause an alarm. Removing the outside cover plate causes alarm activation and internal housing frame allows enough time for the control panel (i.e. dialer) to complete transmission of the alarm signal to the off site location or device. Although it is preferred that the device is utilized with a plunger switch, the invention may also be utilized without one in order to accommodate dwellings without security systems.

DETAILED DESCRIPTION

The device is constructed of a hard plastic or metal material. It is economical to manufacture, cost effective for the end consumer, and easy to install.

Figure 1:
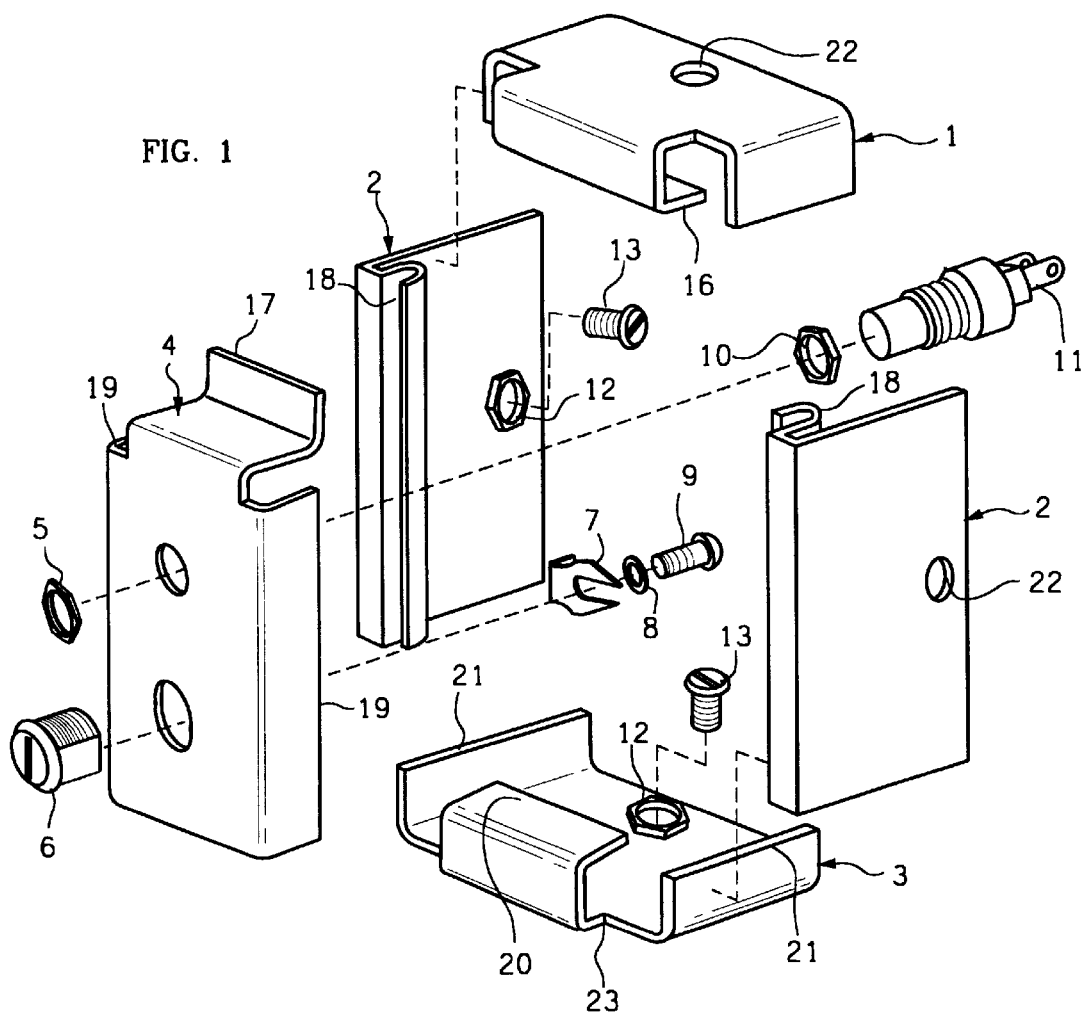
FIG. 1 is a prospective view of the present invention.
Figure 2:
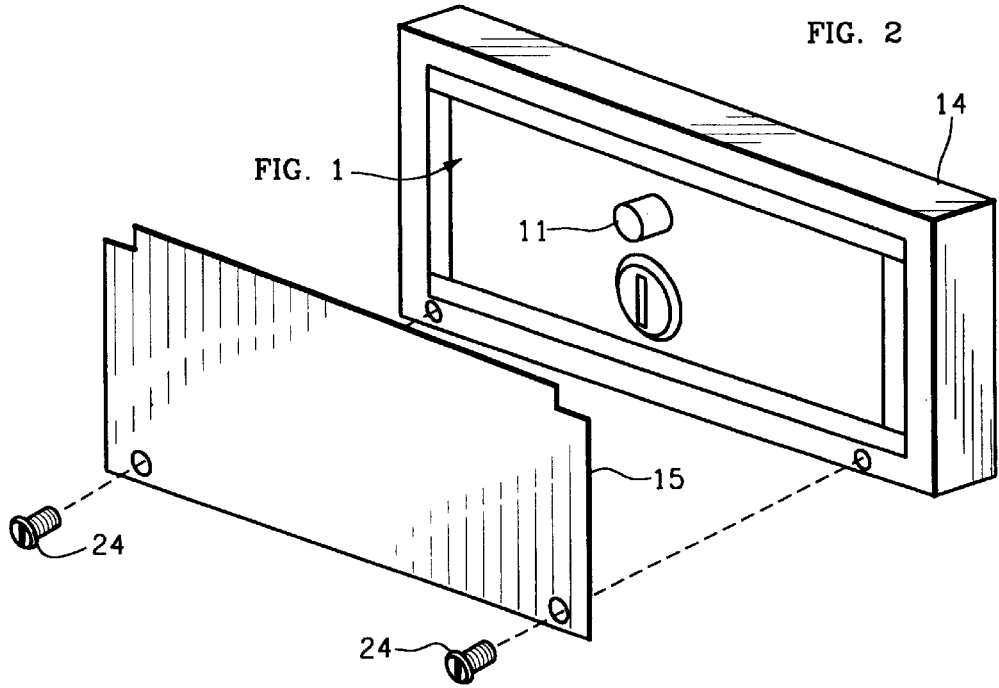
FIG. 2 is a front view of the device inserted and mounted inside an existing telephone access box. This figure also suggests an optional size for the device.

Turning now to FIG. 1, which shows a prospective view of the device, the walls of the device consist of the top piece 1 which attaches to the side pieces 2 and to the bottom piece 3 to complete the mounting frame. The side pieces 2 are designed with J channels 18 that accept the flanges 19 to prevent the removal of the door 4 of the device when the door 4 is in the locked position. When the door 4 is in the locked position, the flange 17 of door 4 engages the flange 16 of the top piece 1 to hold the door 4 in place. The frame is then inserted and mounted into the existing telephone access box 14 as shown in FIG. 2. The frame is mounted by inserting a bolt 13 into a nut 12 which has been attached over a hole 22 in each of the four interior walls. The bolts 13, two of which are not shown, are mounted into the existing access box 14. The door 4 of the device is equipped with a plunger switch 11 which connects to the wires of the alarm system. The plunger switch 11 is held in place by the nuts 5 and 10. The door of the device 4 is also equipped with a cam lock having parts 6,7,8, and 9 which allows access to the interior of the box only by the use of a key. When in the locked position, the locking flange 7 of the cam lock engages a flange 20 of the bottom plate 23 to hold the door 4 in place. When a key is inserted into part 6 of the cam lock, it can be rotated to disengage the locking flange 7 from the flange 20 thereby allowing the door 4 to slip down and be removed from the frame.

FIG. 2 is a front view of the device mounted inside an existing telephone access box 14. FIG. 2 also shows a cover plate 15 that is attached to the outside over the device of the present invention. When cover plate 15 is held in place via screws 24 the cover plate 15 presses against the plunger switch 11. If the cover plate 15 is removed then the plunger switch 11 is released causing an alarm signal to be transmitted. The present invention then prevents access to the phone wires long enough so that the alarm signal can be transmitted before the telephone lines can be cut.

FIG. 1 shows the device of the present invention as having 5 sides that are connected together to form a secure inner chamber for protection of the phone wires. However this chamber could be formed by any solid geometric form, including but not limited to, a one piece square, rectangle or cylinder having an open back and a front plate that is lockable and removable.

From the foregoing, it will be observed that numerous modifications and variations can be effected without departing from the true spirit and scope of the novel concept of the present invention. It is to be understood that no limitation with respect to the specific embodiments illustrated herein is intended or should be inferred. It is, of course, intended to cover by the appended claims all such modifications as fall within the scope of the claims.

I claim:

1. A phone line protection device for insertion into a telephone access box having an interior side and an access box cover plate comprising:

a housing having an inner chamber, said housing having side walls protecting the sides of the inner chamber, said housing having at least a partially open back side, said housing having a cover plate that is removeably attachable to said side walls of said inner chamber, said cover plate having a lock and switching device such that said cover plate can be locked to said side walls, at least one of said side walls having a securing means attachable to said side wall for extending between said side wall and an interior side of said telephone access box allowing attachment of the housing to the interior of the telephone access box when said telephone access box cover plate is in place, and said switching device is disposed on said cover plate so that removal of said access box cover plate from the telephone access box operates said switching device.

2. The device of claim 1 wherein the device is constructed of a hard material that cannot be easily bent or broken.

3. The device of claim 1 wherein when the cover plate is affixed to the said telephone access box the switching device is depressed and when the cover plate is removed, said switching device pushes out causing a broken wire connection and tripping the alarm system.

\* \* \* \* \*